US012646737B2

(12) United States Patent
Harris et al.

(10) Patent No.: US 12,646,737 B2
(45) Date of Patent: Jun. 2, 2026

(54) COMPRESSION MEANS FOR LI-METAL ANODE ELECTROCHEMICAL CELLS

(71) Applicant: Factorial Inc., Woburn, MA (US)

(72) Inventors: Joshua Harris, Reading, MA (US); Yi-Chen Chiang, Woburn, MA (US); Yaqi Tu, Malden, MA (US); David C. Batson, Winchester, MA (US); Seong woo Park, Burlington, MA (US)

(73) Assignee: Factorial Inc., Billerica, MA (US)

( * ) Notice: Subject to any disclaimer, the term of this patent is extended or adjusted under 35 U.S.C. 154(b) by 657 days.

(21) Appl. No.: 18/182,453

(22) Filed: Mar. 13, 2023

(65) Prior Publication Data

US 2023/0299328 A1 Sep. 21, 2023

Related U.S. Application Data

(60) Provisional application No. 63/320,858, filed on Mar. 17, 2022.

(51) Int. Cl.
| | |
|---|---|
| *H01M 10/04* | (2006.01) |
| *B30B 15/06* | (2006.01) |
| *H01M 10/058* | (2010.01) |

(52) U.S. Cl.
CPC ....... *H01M 10/0468* (2013.01); *B30B 15/061* (2013.01); *H01M 10/058* (2013.01)

(58) Field of Classification Search
CPC ............ H01M 10/0468; H01M 10/058; B30B 15/061
See application file for complete search history.

(56) References Cited

U.S. PATENT DOCUMENTS

| | | | |
|---|---|---|---|
| 5,670,272 | A | 9/1997 | Cheu et al. |
| 5,800,939 | A | 9/1998 | Mishina et al. |
| 8,859,132 | B2 | 10/2014 | West et al. |
| 10,505,222 | B2 | 12/2019 | Carignan et al. |
| 10,727,454 | B2 | 7/2020 | Bruch et al. |
| 10,886,511 | B2 | 1/2021 | Westermeier et al. |
| 10,971,725 | B2 | 4/2021 | Jang |
| 11,075,424 | B2 | 7/2021 | Brenner et al. |
| 11,145,889 | B2 | 10/2021 | Woo et al. |
| 11,171,369 | B1 | 11/2021 | Olsson et al. |
| 11,239,488 | B2 | 2/2022 | Busacca et al. |
| 11,342,561 | B2 | 5/2022 | Rogojina et al. |
| 2014/0266066 | A1 | 9/2014 | Turon Teixidor et al. |
| 2019/0036166 | A1 | 1/2019 | Li et al. |
| 2020/0168959 | A1 | 5/2020 | Hettrich |
| 2020/0243838 | A1 | 7/2020 | Jang |

(Continued)

FOREIGN PATENT DOCUMENTS

| | | |
|---|---|---|
| WO | 2020154552 A1 | 7/2020 |
| WO | 2022031579 A1 | 2/2022 |

*Primary Examiner* — Sarah A. Slifka

(57) ABSTRACT

This disclosure relates to rechargeable battery packs and or rechargeable battery modules consisting of electrochemical cells in general and more specifically to lithium metal anode secondary electrochemical cells and the supporting mechanical structure of such packs or modules which apply and maintain a high and uniform normal compression pressure to the face of the interconnected cells of said battery packs, modules or individual cells, in order to suppress dendrite formation during charge and maintain a low cell impedance during charge and discharge. This is achieved with the use of a compression assembly having a compressible sheet with desired properties.

17 Claims, 3 Drawing Sheets

(56)                   References Cited

U.S. PATENT DOCUMENTS

| | | |
|---|---|---|
| 2020/0243854 A1 | 7/2020 | Jang |
| 2020/0251767 A1 | 8/2020 | Harrison et al. |
| 2021/0202990 A1 | 7/2021 | Lee et al. |
| 2022/0109180 A1 | 4/2022 | Li et al. |
| 2022/0181637 A1 | 6/2022 | Jang |

COMPRESSION MEANS FOR LI-METAL ANODE ELECTROCHEMICAL CELLS

CROSS-REFERENCE

This application claims the benefit of U.S. Appl. No. 63/320,858 filed on Mar. 17, 2022, the entire contents of which is hereby incorporated by reference in its entirety.

FIELD

This disclosure relates to rechargeable battery packs and rechargeable battery modules comprising electrochemical cells in general and more specifically to lithium metal anode based secondary electrochemical cells and the supporting mechanical structure of such packs or modules which apply normal compression pressure to the face of the interconnected cells of said battery packs and or modules.

BACKGROUND

In order to increase the energy density of secondary electrochemical cells, it is desirable to utilize lithium metal for the negative or anode electrode. In traditional Li-Ion cells the negative electrode typically consists of a carbon based intercalation material, such as natural or synthetic graphite, coke or hard carbon. These materials have a coulombic capacity in the range of 300 mAh/g to 360 mAh/g. These materials have been used as anode materials in commercial Li-Ion cells. These anode materials may be utilized with a cathode or positive electrode made with various types of crystalline lithium intercalation materials, including but not limited to metallic oxides, such as lithium cobalt oxide (LCO), lithium metal oxide (LMO), lithium nickel cobalt aluminum oxides (NCA), lithium nickel cobalt manganese oxides (NMC), and metal phosphides, such as $FePO_4$ and $MnPO_4$. However, it is still desirable to increase the energy density of the battery cells, for example, in increasing the driving range of electric vehicles. Substituting metallic lithium for carbon or graphite may significantly increase the battery cell's energy density. Lithium metal has a coulombic capacity of 3680 mAh/g which is much higher than that of carbon-based anode. Lithium metal also has a density of 0.534 $g/cm^3$, much lower than graphite (2.25 $g/cm^3$), providing a potential to significantly increase the cell's specific energy density. Present state of the art high energy dense Li-Ion EV battery cells provide a specific energy of about 300 Wh/kg and an energy density of about 600 Wh/liter. These cells are often stacked in a flexible polymer/metal laminate or pouch (referred to as pouch cells). Alternatively, they are wound cells housed in a hard can (usually made of metal) (referred to as prismatic cells) wherein the wall of the hard can provides a certain pressure. In order for these cells to operate for long life with low electrical resistance, the battery pack, module or cell testing apparatus must provide a normal pressure on the face of the cells, normal to the large face of the electrode stack. Most Li-Ion cells can operate with a normal compression pressure in a range from 0.01 MPa to 0.3 MPa.

It is challenging to utilize lithium metal as an anode. During the charging process, the deposition of lithium metal tends to form dendrites at the interface between the separator/electrolyte layer and lithium metal layer. The dendrites may penetrate the separator-electrolyte layer, thus creating an electrical short circuit. In addition to compromised energy density, this electrical short circuit may cause excessive local heating, possibly leading to a thermal runaway safety event.

Furthermore, the thickness change associated with the change in state of charge (SOC) is another obstacle in utilizing lithium metal anode. As the cell is charged lithium metal is deposited on the surface of the anode, increasing the anode thickness. When discharged, the lithium metal is stripped from the anode surface, thereby decreasing its thickness. The change in thickness going from fully discharged (0% SOC) to fully charged (100% SOC) is dependent upon the areal capacity of the cathode electrode. For every 1.0 $mAh/cm^2$ of cathode, the thickness of the anode is changed by approximately 4.9 μm from a fully discharged state (SOC=0%) to a fully charged state (SOC=100%). Typically, a cell comprising a cathode with an areal capacity in a range from 2 $mAh/cm^2$ to 5 $mAh/cm^2$ may have a thickness change of from 20 μm to 50 μm per layer of cathode in the electrode stack. Depending on the initial lithium metal thickness at time of cell manufacture, which may range from 0 or so called 'anode free' to typical 40 μm per side, the overall cell thickness growth on charge may be in the range of 5% up to about 20% of the cell discharged thickness.

It has been realized that an elevated normal pressure in a range from 0.5 to 3 MPa suppresses dendrite formation during charging, causing the lithium to deposit in a smooth dense layer on the anode surface, which is required for a long and safe operational life of the lithium-metal anode battery cell.

Herein is disclosed a method to provide and maintain the high pressure required to suppress dendrite formation during charge, allow low electrical resistance and accommodate the thickness change of the cell during charging and discharging operation, while maintaining the required, but not excessive, normal pressure on the secondary Lithium metal anode cell.

Within the prior art battery packs and or modules, utilizing pouch Li-ion cells, the cell thickness tolerance and thickness growth is accommodated by relatively soft polymer foam materials. These polymer foam materials are designed to operate at pressures of 0.01 MPa up to 0.3 MPa, typically. Beyond around 0.3 to 0.5 MPa, these materials are nearly fully compressed to strains as high as 70% and can no longer accommodate cell change in thickness during charge and discharge cycling. FIG. 1 is an exemplary stress-strain curve of such polymer foam materials. Also at these higher pressures and compression strains the prior art materials will take on a permanent thickness reduction, resulting in significant reduction in compression pressure when the cells are subsequently discharged to a low SOC. The materials used in current Li-Ion battery packs, modules and testing fixtures, typically utilize much softer open cell polyurethane foams, such as Poron® from Rogers Corp. These foams are engineered to operate in the 0.001 to 0.3 MPa range and generally are fully compressed at 0.3 MPa and cannot accommodate any more compression strain. This is well below the pressure range needed for the lithium metal anode secondary cell. In order to operate at the much higher pressures needed for the suppression of lithium dendrite formation, and still accommodate thickness changes due to charging and discharging, a material capable of compression at up to 0.5 to 3.0 MPa while still remaining compliant is required.

SUMMARY

Disclosed herein is a clamping or compression assembly to provide a high uniform mechanical clamping pressure on the face of a secondary lithium battery cell or a series of secondary battery cells mounted in a battery pack or battery module. The mechanical clamping/compressing means/assembly includes two substantially rigid end plates, one or two compressible polymeric foam material layers and a secondary lithium battery cell. The compressible polymeric material layer is placed between a first cell face and the first rigid plate. Optionally a second compressible polymeric layer may be placed between a second cell face and the second rigid plate or the second rigid plate may contact the second cell face directly. The rigid plates are mechanically connected via four or more threaded fasteners. The assembly of first end plate, first compressible layer, secondary lithium cell, second compressible layer and second rigid plate are placed flat in a hydraulic press or similar compressing equipment and the assembly compressed to the desired compression pressure. The four or more fasteners are then tightened to maintain the gap and thus the compression pressure on the assembly after removal from the hydraulic press.

Thus in one embodiment, the compression assembly comprises a) a first plate; b) a second plate opposing the first plate; and c) a compressible sheet mounted to one of the first and second plates so that the compressible sheet is positioned between opposing faces of the first and second plates, wherein upon application of an external compression to the compression assembly of 1.3 MPa for a minute, an average normal pressure of the compressible sheet on a lithium metal battery cell positioned between the first and second plates after removal of the external compression is at least 65% of an average normal pressure of the compressible sheet during the application of the external compression.

The compressible layer may be a polymeric foam selected for sufficient rigidity to operate at the required high pressure of 0.5 to 3.0 MPa without significant permanent set or loss of recoverable thickness with accompanied loss of pressure during subsequent charging and discharging cycles. In one embodiment, the polymeric foam comprises a crosslinked polymer or copolymer. In one embodiment, the polymeric foam also comprises a filler such as carbon black that can improve the mechanical properties including dynamic properties such as elasticity. Additionally the polymeric foam material is produced with a combination of material mechanical properties, porosity and pore size distribution such that the material compression stress-strain behavior is generally non-linear strain and provides an initial high compression and an effective reduction of the compression modulus in the operating pressure range required for proper charge/discharge operation of the secondary cell.

This reduction in modulus or softening allows the accommodation of non-uniform thickness change of the cell due to non-uniform current density across the surface of the electrodes as well as non-uniformity of the cell thickness across the face of the cell due to assembled component thickness tolerances. This strain region of lower modulus further maintains the compression pressure in the desired range without excessive rise in pressure during charging and over the life of the cell as well as the cell thickness will permanently increase over the operating life of the cell.

DETAILED DESCRIPTION

The disclosure will be better understood by reference to the Experimental Details which follow, but those skilled in the art will readily appreciate that the specific experiments detailed are only illustrative, and are not meant to limit the invention as described herein, which is defined by the claims which follow thereafter.

It is to be noted that the transitional term "comprising", which is synonymous with "including", "containing" or "characterized by", is inclusive or open-ended and does not exclude additional, un-recited elements or method steps.

Figure 1:
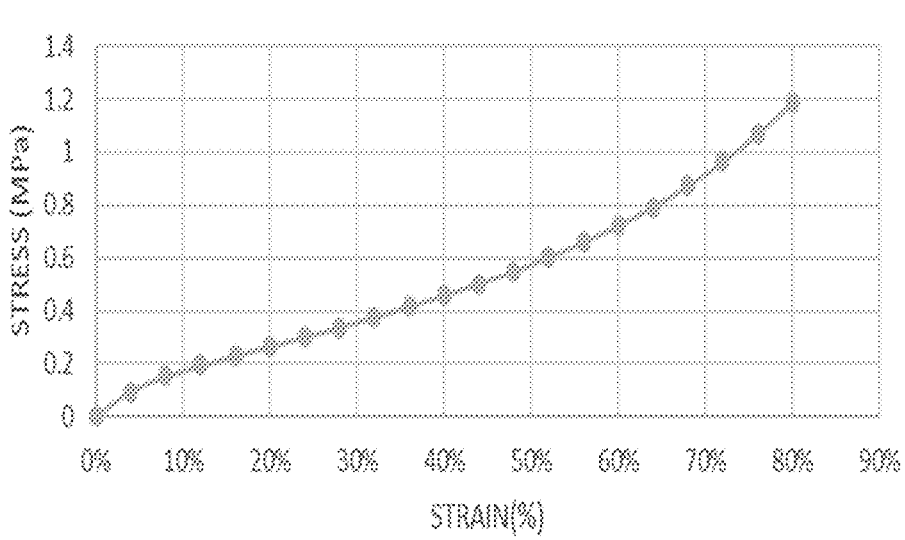
FIG. 1 shows a stress-strain curve of a compressible foam layer according to prior art.
Figure 2:
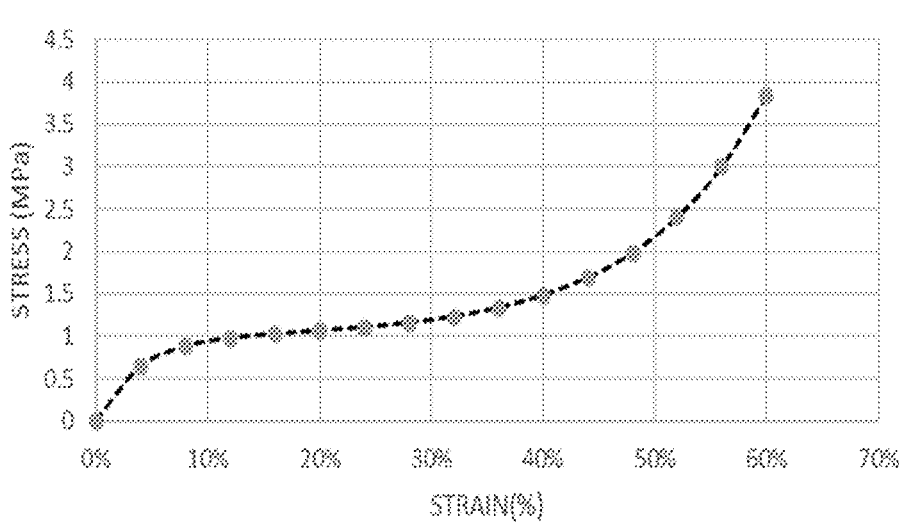
FIG. 2 shows a stress-compression strain curve of an exemplary foam according to one embodiment of the current disclosure.

Disclosed herein is a clamping or compression assembly to provide a high uniform mechanical clamping pressure on the face of a secondary lithium battery cell or a series of secondary battery cells through the use of a compressible sheet having a stress-strain curve that allows for the compressive stress to be in a range from 0.5 to 3.0 MPa while still remaining compliant (for example, with a strain of less than or equal to 60% in the operating compressive stress range). Such materials are not fully compressed in the compressive stress range from 0.5 to 3.0 MPa and will remain compressible and change thickness in an amount corresponding to changes in the cell thickness during charge and discharge so that the compressible sheet maintains a consistent amount of pressure on the cell while also inhibiting dendrite formation. FIG. 2 shows an exemplary stress-strain curve of a foam having these features.

Figure 3:
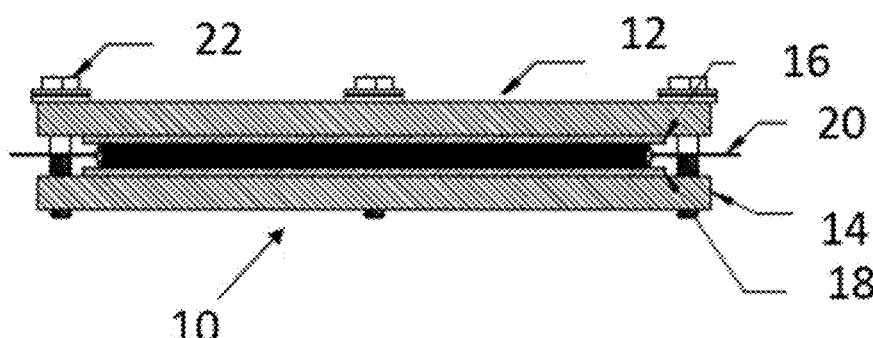
FIG. 3 shows a side view of a compression assembly according to one embodiment of the present disclosure.

In some embodiments, one or more small format pouch cells, for example with an NMC cathode, organic electrolyte, polymer separator and lithium metal anode are assembled into a compression fixture or assembly. FIG. 3 shows an exemplary compression assembly (10) including first and second plates (12, 14) opposing each other. In some embodiment a compressible sheet or pad (16, 18) can be placed, mounted or otherwise affixed to the opposing surfaces of the first and second plates (12, 14). In some embodiments, a compressible sheet or pad (16) is only placed, mounted or otherwise affixed to a surface of one of the first and second plates (12, 14). One of more pouch cells (20) (e.g., lithium metal battery cell) is positioned between the first and second plates (12,14) and the cell(s) (20) are in contact with the compressible sheet(s) (16, 18). The first and second plates (12, 14) may be connected together by one or more fasteners (22). For example, the plates may have one or more holes that are aligned with each other and fasteners (22) may be inserted through the holes, for example threaded fasteners, to hold or fasten the plates (12, 14) together. Before fixing the fasteners (22), the assembly (10) may be compressed by an external compressive force, for example by a hydraulic press to compress the compressible sheet(s) (16, 18). In some embodiments the external compressive force may be in a range from 0.5 MPa to 1.3 MPa, 0.5 MPa to 1.0 MPa, 0.5 MPa, to 0.8 MPa, 0.7 MPa to 1.3 MPa, 0.7 MPa to 1.0 MPa, 0.9 MPa to 1.3 MPa, or any and all ranges and subrange therebetween. The fasteners (22) may be tightened while the external compressive force is applied and once the fasteners are tightened, the external compressive force may be removed and the fasteners (22) maintain the distance (gap) between the plates (12, 14). The compression pressure (e.g., the external compressive force) on the plates was varied between 0.5 MPa and 1.3 MPa and the cell capacity monitored during charge/discharge cycling. Initial experiments were run with 1.5 mm thick EPM rubber sheet. It was found that the cell capacity fade increased significantly at pressure below 1.0 MPa. It was further found, through pressure mapping measurements, that the mechanical deflection of the rigid plates has a negative impact on the uniformity of pressure on the cell, especially with more rigid or stiffer foam materials. The stiffness of the plates needs to high enough to keep the center plate deflection to less than 100 μm at 1.3 MPa. Thus, using Aluminum alloy AA7075, the plates thickness is maintained at 17.5 mm or greater. With lower strength alloys, such as AA6061, the plate thickness should be at least 20 mm. Thus, in some embodiments, the first and second plates are rigid are made of a material and thickness that have a mechanical stiffness, by which the center of each of the plates has a normal plate deflection of less than 100 μm, less than 90 μm, less than 80 μm, or less than 70 μm at 1.3 MPa. Exemplary materials for the rigid plates may include aluminum and aluminum alloys, for example aluminum alloys AA7075 and AA6061. In some embodiments, the thickness of the plates may be at least 15 mm, at least 17.5 mm, at least 20 mm, at least 22.5 mm, or at least 25 mm.

In some embodiments, compression pad/sheet materials are chosen based on the impact of the material's stress-strain behavior on the charge/discharge cycling performance of the lithium metal anode cell. Compressible materials which have a flattening or softening of the stress-strain response in the pressure range required will provide a more uniform local pressure as well as the required global pressure to accommodate the overall thickness changes during the charge and discharge cycling, as well as accommodate local variations or nonuniformity of the cell thickness due to variations in cell SOC across the electrode faces, and local variations in cell thickness due to manufactured component thickness variation, such as cathode thickness, separator thickness and Lithium metal thickness. For example, as shown in the exemplary stress-strain curve of FIG. 2 compressible materials are used that have a generally flat stress-strain curve, or a small change in slope of the stress-strain curve, in the pressure range of interest during the application of the external compression and after the removal of the external compression. In some embodiments, the stress on the stress-strain curve is the average normal pressure exerted by the compressible sheet on the cell. In some embodiments, the average normal pressure range of interest that is exerted by the compressible sheet after removal of the external compressive force (for example 1.3 MPa for 1 minute) is in a range from 0.5 MPa to 3.0 MPa, 0.5 MPa to 2.7 MPa, 0.5 MPa, to 2.5 MPa, 0.5 MPa to 2.2 MPa, 0.5 MPa to 2.0 MPa, 0.7 MPa to 3.0 MPa, 0.7 MPa to 2.7 MPa, 0.7 MPa, to 2.5 MPa, 0.7 MPa to 2.2 MPa, 0.7 MPa to 2.0 MPa, 1.0 MPa to 3.0 MPa, 1.0 MPa to 2.7 MPa, 1.0 MPa, to 2.5 MPa, 1.0 MPa to 2.2 MPa, 1.0 MPa to 2.0 MPa, 1.2 MPa to 3.0 MPa, 1.2 MPa to 2.7 MPa, 1.2 MPa, to 2.5 MPa, 1.2 MPa to 2.2 MPa, 1.0 MPa to 2.0 MPa, 1.5 MPa to 3.0 MPa, 1.5 MPa to 2.7 MPa, 1.5 MPa, to 2.5 MPa, 1.5 MPa to 2.2 MPa, 1.5 MPa to 2.0 MPa, 1.7 MPa to 3.0 MPa, 1.7 MPa to 2.7 MPa, 1.7 MPa, to 2.5 MPa, 1.7 MPa to 2.2 MPa, 2.0 MPa to 3.0 MPa, 2.0 MPa to 2.7 MPa, 2.0 MPa, to 2.5 MPa, or any ranges and subranges therebetween. In some embodiments, compressible materials are used for the compressible sheet that remain compressible after application of an external compression of 1.3 MPa for a minute. In some embodiments, compressible materials that meet the condition of remaining compressible upon application of an external compression to the compression assembly of 1.3 MPa for a minute have an average normal pressure of the compressible sheet on a lithium metal battery cell positioned between the first and second plates after removal of the external compression is at least 50%, at least 55%, at least 60%, at least 65%, at least 67%, at least 70%, at least 72%, at least 75%, at least 77%, at least 80%, at least 82%, or at least 85% of an average normal pressure of the compressible sheet during the application of the external compression. In some embodiments, compressible materials that meet the condition of remaining compressible upon application of an external compression to the compression assembly of 1.3 MPa for a minute have an average normal pressure of the compressible sheet on a lithium metal battery cell positioned between the first and second plates after removal of the external compression that is less than or equal to 60% strain, less than or equal to 55% strain, less than or equal to 50% strain, less than or equal to 45% strain, or less than or equal to 40% strain. Such materials are not fully compressed in the compressive stress range from 0.5 to 3.0 MPa and will remain compressible and change thickness in an amount corresponding to changes in the cell thickness during charge and discharge so that the compressible sheet maintains a consistent amount of pressure on the cell while also inhibiting dendrite formation.

In some embodiments, compressible materials that meet the above conditions include polymeric compressible material such as one fabricated of polymer foam, where the base material is a thermoplastic elastomer (TPE), such as thermoplastic urethane elastomer, thermoplastic polyester, or thermoplastic olefin. The polymeric foam may also be manufactured with an elastomeric silicone rubber, or one of the elastomeric natural or synthetic rubbers, such as EPM, SBR or butyl rubber (BR). The porous foam structure may consist of closed cells or a mixture of open and closed cells.

In some embodiments, the combination of porosity, density, and/or thickness may contribute to the stress-strain properties of the compressible materials. In some embodiments, the density of the compressible sheets may be in a range from $0.3 \text{ g/cm}^3$ to $0.8 \text{ g/cm}^3$, $0.3 \text{ g/cm}^3$ to $0.75 \text{ g/cm}^3$, $0.3 \text{ g/cm}^3$ to $0.7 \text{ g/cm}^3$, $0.3 \text{ g/cm}^3$ to $0.65 \text{ g/cm}^3$, $0.3 \text{ g/cm}^3$ to $0.6 \text{ g/cm}^3$, $0.3 \text{ g/cm}^3$ to $0.55 \text{ g/cm}^3$, $0.3 \text{ g/cm}^3$ to $0.5 \text{ g/cm}^3$, $0.3 \text{ g/cm}^3$ to $0.45 \text{ g/cm}^3$, $0.3 \text{ g/cm}^3$ to $0.4 \text{ g/cm}^3$, $0.35 \text{ g/cm}^3$ to $0.8 \text{ g/cm}^3$, $0.35 \text{ g/cm}^3$ to $0.75 \text{ g/cm}^3$, $0.35 \text{ g/cm}^3$ to $0.7 \text{ g/cm}^3$, $0.35 \text{ g/cm}^3$ to $0.65 \text{ g/cm}^3$, $0.35 \text{ g/cm}^3$ to $0.6 \text{ g/cm}^3$, $0.35 \text{ g/cm}^3$ to $0.55 \text{ g/cm}^3$, $0.35 \text{ g/cm}^3$ to $0.5 \text{ g/cm}^3$, $0.35 \text{ g/cm}^3$ to $0.45 \text{ g/cm}^3$, $0.35 \text{ g/cm}^3$ to $0.4 \text{ g/cm}^3$, $0.4 \text{ g/cm}^3$ to $0.8 \text{ g/cm}^3$, $0.4 \text{ g/cm}^3$ to $0.75 \text{ g/cm}^3$, $0.4 \text{ g/cm}^3$ to $0.7 \text{ g/cm}^3$, $0.4 \text{ g/cm}^3$ to $0.65 \text{ g/cm}^3$, $0.4 \text{ g/cm}^3$ to $0.6 \text{ g/cm}^3$, $0.4 \text{ g/cm}^3$ to $0.55 \text{ g/cm}^3$, $0.4 \text{ g/cm}^3$ to $0.5 \text{ g/cm}^3$, $0.4 \text{ g/cm}^3$ to $0.45 \text{ g/cm}^3$, $0.45 \text{ g/cm}^3$ to $0.8 \text{ g/cm}^3$, $0.45 \text{ g/cm}^3$ to $0.75 \text{ g/cm}^3$, $0.45 \text{ g/cm}^3$ to $0.7 \text{ g/cm}^3$, $0.45 \text{ g/cm}^3$ to $0.65 \text{ g/cm}^3$, $0.45 \text{ g/cm}^3$ to $0.6 \text{ g/cm}^3$, $0.45 \text{ g/cm}^3$ to $0.55 \text{ g/cm}^3$, $0.45 \text{ g/cm}^3$ to $0.5 \text{ g/cm}^3$, $0.5 \text{ g/cm}^3$ to $0.8 \text{ g/cm}^3$, $0.5 \text{ g/cm}^3$ to $0.75 \text{ g/cm}^3$, $0.5 \text{ g/cm}^3$ to $0.7 \text{ g/cm}^3$, $0.5 \text{ g/cm}^3$ to $0.65 \text{ g/cm}^3$, $0.5 \text{ g/cm}^3$ to $0.6 \text{ g/cm}^3$, $0.5 \text{ g/cm}^3$ to $0.55 \text{ g/cm}^3$, and all ranges and subranges therebetween. In some embodiments, the porosity of the compressible sheets may be in a range from 20% to 70%, 20% to 65%, 20% to 60%, 20% to 55%, 20% to 50%, 20% to 45%, 20% to 40%, 20% to 35%, 20% to 30%, 25% to 70%, 25% to 65%, 25% to 60%, 25% to 55%, 25% to 50%, 25% to 45%, 25% to 40%, 25% to 35%, 30% to 70%, 30% to 65%, 30% to 60%, 30% to 55%, 30% to 50%, 30% to 45%, 30% to 40%, 35% to 70%, 35% to 65%, 35% to 60%, 35% to 55%, 35% to 50%, 35% to 45%, 40% to 70%, 40% to 65%, 40% to 60%, 40% to 55%, 40% to 50%, 45% to 70%, 45% to 65%, 45% to 60%, 45% to 55%, or any and all ranges and subranges therebetween. In some embodiments, the thickness of the compressible sheets may be in a range from 1/16 inch to 1/2 inch, 1/16 inch to 1/4 inch, 1/8 inch to 1/2 inch, 1/8 inch to 1/4 inch, 1/4 inch to 1/2 inch, or any and all ranges and subranges therebetween. In some embodiments, the compressible material is chosen so that after removal of the external compression, the compressible material has a substantially uniform application of compressive stress across the surface of the cell, for example the variation in between the highest pressure and average pressure across the surface of the cell is less than or equal to 100%, less than or equal to 65%, less than or equal to 50%, less than or equal to 45%, less than or equal to 40%, less than or equal to 35%, less than or equal to 30%, less than or equal to 25%, less than or equal to 20% or less than or equal to 15% of the average pressure. In some embodiments, spring loaded fasteners may be used in place of fixed threaded fasteners. The use of spring-loaded compression plates will further limit the variation of pressure during charge/disfoam material. For each type of foam material tested, the compression assembly included two rigid plates of 7075 aluminum alloy having a thickness of approximately 17.5 mm; a foam sheet that was approximately 1/8 of an inch thick was mounted on each of the rigid plates; an 8 mm thick 20 Ah pouch cell was placed between the foam samples; and a Tekscan pressure mapping sensor was placed between the pouch cell and one of the foam samples. The assembled plates, cell, pressure sensor and foam sheets were then placed in a hydraulic press and pressed to approximately 1.3 MPa. The pressure distribution with the hydraulic press ("in press") was then measured and recorded with the Tekscan pressure mapping sensor. After holding the assembly at 1.3 MPa for 1 minute, 12 threaded bolts threaded between the two rigid plates were tightened to a torque of 5 in-lbs with a torque wrench. The hydraulic press pressure was then removed, and the resulting pressure distribution ("out of press") was measured and recorded with the Tekscan pressure mapping sensor.

TABLE 1

Summary of In Press and Out of Press Pressure

Figure 4:
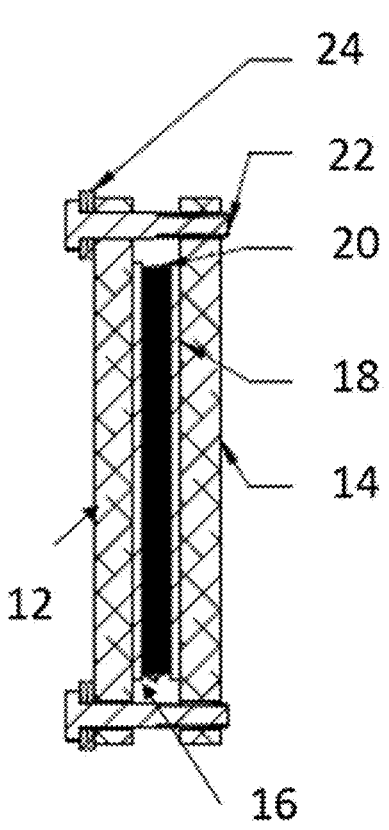
FIG. 4 shows a cross-sectional view of a compression assembly with spring loaded fasteners according to one embodiment of the present disclosure.
Figure 5:
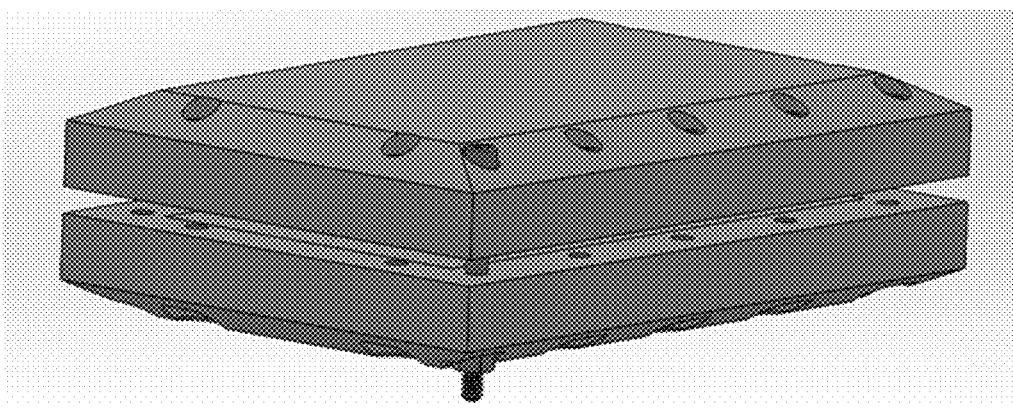
FIG. 5 shows an isometric view of a compression assembly according to one embodiment of the present disclosure.

| Foam | Density (g/cm³) | In Press Pressure (psi) | | | Out of Press Pressure (psi) | | | % pressure retained |
|------|------|------|------|------|------|------|------|------|
| | | Highest | Avg. | Range | Highest | Avg. | Range | |
| Polyurethane A | 0.30 | 385 | 240 | 145 | 212 | 167 | 45 | 69.6 |
| Polyurethane A | 0.35 | 326 | 246 | 80 | 232 | 181 | 51 | 73.6 |
| Polyurethane A | 0.40 | 319 | 244 | 75 | 242 | 200 | 42 | 82.0 |
| Polyurethane A | 0.45 | 356 | 270 | 86 | 279 | 210 | 69 | 77.7 |
| Polyurethane B | 0.4 | 431.9 | 267.9 | 164 | 284.6 | 191.6 | 93 | 71.5 |
| Polyurethane B | 0.5 | 403.8 | 291.2 | 112.6 | 324.7 | 238.3 | 86.4 | 81.8 |
| Polyurethane B | 0.7 | 455.4 | 315.7 | 139.7 | 356 | 265 | 91 | 83.9 |
| Closed Cell Silicone | 0.62 | 382 | 239 | 143 | 246 | 170 | 76 | 71.1 |
| Closed Cell Silicone | 0.35 | 405.8 | 224.3 | 181.5 | 287.9 | 174.1 | 174.3 | 70.5 |
| Closed Cell Silicone | 0.62 | 310.9 | 194.5 | 116.4 | 190.6 | 136.5 | 85.2 | 69.6 |
| Closed Cell Silicone | 0.50 | 475.8 | 220.9 | 254.9 | 238.3 | 145.5 | 130.2 | 74.7 | charge cycling in a linear fashion based on the spring stiffness or spring rate of the applied springs. The use of spring-loaded compression plates is shown for example in FIG. 4 and has the additional benefits of compensating for any permanent compression set that the compressible foam material may experience at elevated temperature and also compensate for the increased stiffness of the compressible foam when operating at low ambient temperature.

In some embodiments, the use of Belleville spring washers (24) for providing compression force on the rigid plates (12, 14) is preferred to coil springs due to flexibility in design, as the spring washers can be stacked in series and or parallel to provide the spring force and working displacement needed in a more compact vertical space. The stored energy of a Belleville is considerably less than an equivalent coil spring, providing less risk of injury in the event of a mechanical failure of a fastener.

Example 1

The pressure uniformity of the compression assemblies on a lithium metal battery cell, before and after the application of external pressure, were evaluated using several types of The testing procedure was carried out with four 1/8 inch (3.175 mm) foam samples of a first microcellular polyurethane elastomer foam ("Polyurethane A"), a second microcellular polyurethane elastomer foam ("Polyurethane B"), and a closed cell silicone elastomer foam. The results are listed in Table 1. The pressure distribution across the samples was not uniform for in press and out of press measurements. The highest pressure, the average pressure, and the pressure range (highest pressure minus the average pressure) is listed in Table 1 for both the in press and out of press measurements. All pressures listed in Table 1 are a normal pressure. The percent pressure retained is also recorded and was determined based on the average pressure in press and the average pressure out of press.

Example 2

The same test as set forth in Example 1 above, was performed on Polyurethane A with densities 0.3 g/cm³, 0.35 g/cm³, 0.4 g/cm³ and 0.45 g/cm³ except the external pressure applied by the press was approximately 1 MPa. The uniformity of the pressure applied to the cell by the Polyurethane A samples was measured by calculating the difference between the pressure at the 95th percentile and the 5th percentile (the "90% range") and is included in Table 2 below.

This testing has shown that these more rigid elastomeric foams can maintain a high and uniform normal pressure on the cell after being compressed and fastened in the compression fixture assembly. The conclusion of this testing is that these more rigid foam materials will provide better performance than prior art open cell urethane foams in terms of maintaining a high pressure and uniform pressure given the cell thickness variation due to thickness tolerance and thickness change due to SOC changes.

TABLE 2

| Sample (thickness, type, density) | Avg. Pressure (PSI) | 90% Range (PSI) | 90% Range/ Avg. Pressure (%) |
|---|---|---|---|
| ⅛ inch Polyurethane A 0.3 g/cm³ | 181.4 | 75.5 | 41.6 |
| ⅛ inch Polyurethane A 0.35 g/cm³ | 186.7 | 103.5 | 55.4 |
| ⅛ inch Polyurethane A 0.4 g/cm³ | 204.6 | 65.5 | 32.0 |
| ⅛ inch Polyurethane A 0.45 g/cm³ | 211.1 | 124.2 | 58.8 |

Pressure Summary after removal from the press

Example 3

Pouch cells will be tested for performance with the various foam types described above to evaluate the impact on cycle life and cell impedance. It is expected that foam materials with a lower slope of stress vs strain in the preferred initial operating pressure range of 1.0 MPa to 1.3 MPa will provide an improved performance in comparison to stiffer materials having a higher stress-strain slope in the preferred operating pressure range, The test cells will be fixtured for testing with rigid plates as described above in Example 1 and cycled from 0% SOC to 100% SOC at a charging rate of C/3 and discharging rates ranging from C/3 to 1 C, at a temperature ranging from −10° C. to +45° C.

ASPECTS

In a first aspect, a compression assembly comprises: a. a first plate; b. second plate opposing the first plate; and c. a compressible sheet mounted to one of the first and second plates so that the compressible sheet is positioned between opposing faces of the first and second plates, wherein upon application of an external compression to the compression assembly of 1.3 MPa for a minute, an average normal pressure of the compressible sheet on a lithium metal battery cell positioned between the first and second plates after removal of the external compression is at least 65% of an average normal pressure of the compressible sheet during the application of the external compression.

In a second aspect according the first aspect, the average normal pressure after removal of the external compression is in a range from 0.5 MPa to 3.0 MPa.

In a third aspect according to the second aspect, the average normal pressure after removal of the external compression is in a range from 1.0 MPa to 2.0 MPa.

In a fourth aspect according to any of the previous aspects, a compressive strain on the compressible sheet upon application of the external pressure is less than or equal to 60%.

In a fifth aspect according to any of the previous aspects, the first and second plates have a mechanical stiffness, by which the center of each of the plates has a normal plate deflection of less than 100 μm upon application of 1.3 MPa.

In a sixth aspect according to any of the previous aspects, the compressible sheet comprises a thermoplastic elastomeric foam material.

In a seventh aspect according to the sixth aspect, the thermoplastic elastomeric foam material comprises a thermoplastic microcellular urethane elastomer foam having at least one a porosity in a range from 20% to 65% and a density in a range from 0.3 g/cm³ to 0.8 g/cm³.

In an eighth aspect according to any of the previous aspects, the compressible sheet is a closed cell silicone elastomeric foam.

In a ninth aspect according to the eighth aspect, the closed cell silicone elastomeric foam having at least one of a porosity in a range from 20% to 70% and a density in a range from 0.5 g/cm³ to 0.7 g/cm³.

In a tenth aspect according to any of the previous aspects, the normal pressure on the cell after removal of the external compression has a variation of less than 65% across the surface the cell. In some embodiments, the normal pressure on the cell after removal of the external compression exhibits a 90% distribution index of less than or equal to 60%, less than or equal to 50%, less than or equal to 45%, less than or equal to 40%, less than or equal to 35%, or less than or equal to 30%, wherein the 90% distribution index is calculated by the 90% Range/Average Pressure×100%.

In an eleventh aspect according to any of the previous aspects, the compression assembly further comprises at least one lithium metal battery cell positioned between the first and second plates.

In a twelfth aspect according to any of the previous aspects, the compressible sheet has a thickness in a range from 1/16 inch to ½ inch.

In a thirteenth aspect according to any of the previous aspects, the compressible sheet has a thickness in a range from ⅛ inch to ¼ inch.

In a fourteenth aspect according to any of the previous aspects, the compression assembly further comprises one or more threaded fasteners clamping the first and second plates together.

In a fifteenth aspect according to the fourteenth aspect, the one or more threaded fasteners are adjusted to compensate deflections of the first and second rigid plates and/or the compressible sheet.

In a sixteenth aspect according to the fourteenth aspect, the one or more threaded fasteners are adjusted to compensate volume change of the cell during charging or operation.

In a seventeenth aspect according to any of the previous aspects, the compressible sheet is mounted to the first plate and further comprising a second compressible sheet mounted to the second plate.

In an eighteenth aspect, the average normal pressure of the compressible sheet on the lithium metal battery cell positioned between the first and second plates after removal of the external compression is at least 65% of an average normal pressure of the compressible sheet during the application of the external compression.

What is claimed is:

1. An assembly of a battery pack, the assembly comprising:

a. a first plate;

b. a second plate opposing the first plate; and c. a compressible sheet mounted to one of the first and second plates so that the compressible sheet is positioned between opposing faces of the first and second plates, wherein upon application of an external compression to the compression assembly of 1.3 MPa for a minute, the compressible sheet exerts an average normal pressure on a lithium metal battery cell positioned between the first and second plates, and after removal of the external compression, the compressible sheet exerts another average normal pressure that is at least 65% of the average normal pressure during the application of the external compression, and wherein the normal pressure on the cell after removal of the external compression has a variation of less than 65% across the surface of the lithium metal battery cell.

2. The assembly of claim 1, wherein the average normal pressure after removal of the external compression is in a range from 0.5 MPa to 3.0 MPa.

3. The assembly of claim 2, wherein the average normal pressure after removal of the external compression is in a range from 1.0 MPa to 2.0 MPa.

4. The assembly of claim 1, wherein a compressive strain on the compressible sheet upon application of the external pressure is less than or equal to 60%.

5. The assembly of claim 1, wherein the first and second plates have a mechanical stiffness, by which the center of each of the plates has a normal plate deflection of less than 100 μm upon application of 1.3 MPa.

6. The assembly of claim 1, wherein the compressible sheet comprises a thermoplastic elastomeric foam material.

7. The assembly of claim 6, wherein the thermoplastic elastomeric foam material comprises a thermoplastic microcellular urethane elastomer foam having at least one a porosity in a range from 20% to 65% and a density in a range from 0.3 g/cm$^3$ to 0.8 g/cm$^3$.

8. The assembly of claim 1, wherein the compressible sheet is a closed cell silicone elastomeric foam.

9. The assembly of claim 8, wherein the closed cell silicone elastomeric foam having at least one of a porosity in a range from 20% to 70% and a density in a range from 0.5 g/cm$^3$ to 0.7 g/cm$^3$.

10. The assembly of claim 1, wherein the normal pressure on the cell after removal of the external compression exhibits a 90% distribution index of less than or equal to 60%, wherein the 90% distribution index is calculated by following a 90% range of pressure/the average pressure×100%, wherein the 90% range of pressure is a difference between the normal pressure at the 95th percentile and the normal pressure at the 5th percentile.

11. The assembly of claim 1, further comprising at least one lithium metal battery cell positioned between the first and second plates.

12. The assembly of claim 1, wherein the compressible sheet has a thickness in a range from 1/16 inch to 1/2 inch.

13. The assembly of claim 1, wherein the compressible sheet has a thickness in a range from 1/8 inch to 1/4 inch.

14. The assembly of claim 1, further comprising one or more threaded fasteners clamping the first and second plates together.

15. The assembly of claim 14, wherein the one or more threaded fasteners are adjusted to compensate deflections of the first and second rigid plates and/or the compressible sheet.

16. The assembly of claim 14, wherein the one or more threaded fasteners are adjusted to compensate volume change of the cell during charging or operation.

17. The assembly of claim 1, wherein the compressible sheet is mounted to the first plate and further comprising a second compressible sheet mounted to the second plate.

* * * * *